INVENTOR.
ROBERT SIDNEY SEGSWORTH
BY
ATTORNEY

TYPICAL MELTING CYCLE
AUTOMATIC CONTROL SET AT MAX. POWER

TYPICAL MELTING CYCLE
AUTOMATIC CONTROL SET AT 60% OF MAXIMUM POWER

INVENTOR.
ROBERT SIDNEY SEGSWORTH
BY
ATTORNEY

United States Patent Office 3,300,712
Patented Jan. 24, 1967

3,300,712
CONTROL DEVICE FOR AUTOMATICALLY ADDING AND SUBTRACTING CAPACITORS TO MAINTAIN PRESELECTIVE POWER OUTPUT
Robert Sidney Segsworth, Warren, Ohio, assignor to Ajax Magnethermic Corporation, Warren, Ohio, a corporation of Ohio
Filed Mar. 26, 1964, Ser. No. 355,004
4 Claims. (Cl. 323—105)

My invention relates to frequency converters and relates more particularly to automatic control devices for maintaining a preselected power output level regardless of the ohmic value of the load and the voltage changes in the power supply to the frequency converter unit.

In certain types of frequency converters with which this invention is concerned, power output has been largely controlled by the addition or subtraction of capacitance in the output circuit. This has commonly been accomplished by manual switching means.

It is an object of this invention to automatically accomplish the switching in and out of capacitance in an improved manner whereby the power output can be maintained at a preselected level and at the same time provision is made against over voltage and under certain conditions loss of control due to "overtuning" caused by the addition of excess capacitance.

As a result of my invention the frequency converter operates in an optimum manner.

Other objects of my invention and the invention will become more readily apparent by referring to the description and accompanying drawings, in which drawings.

Figure 1:
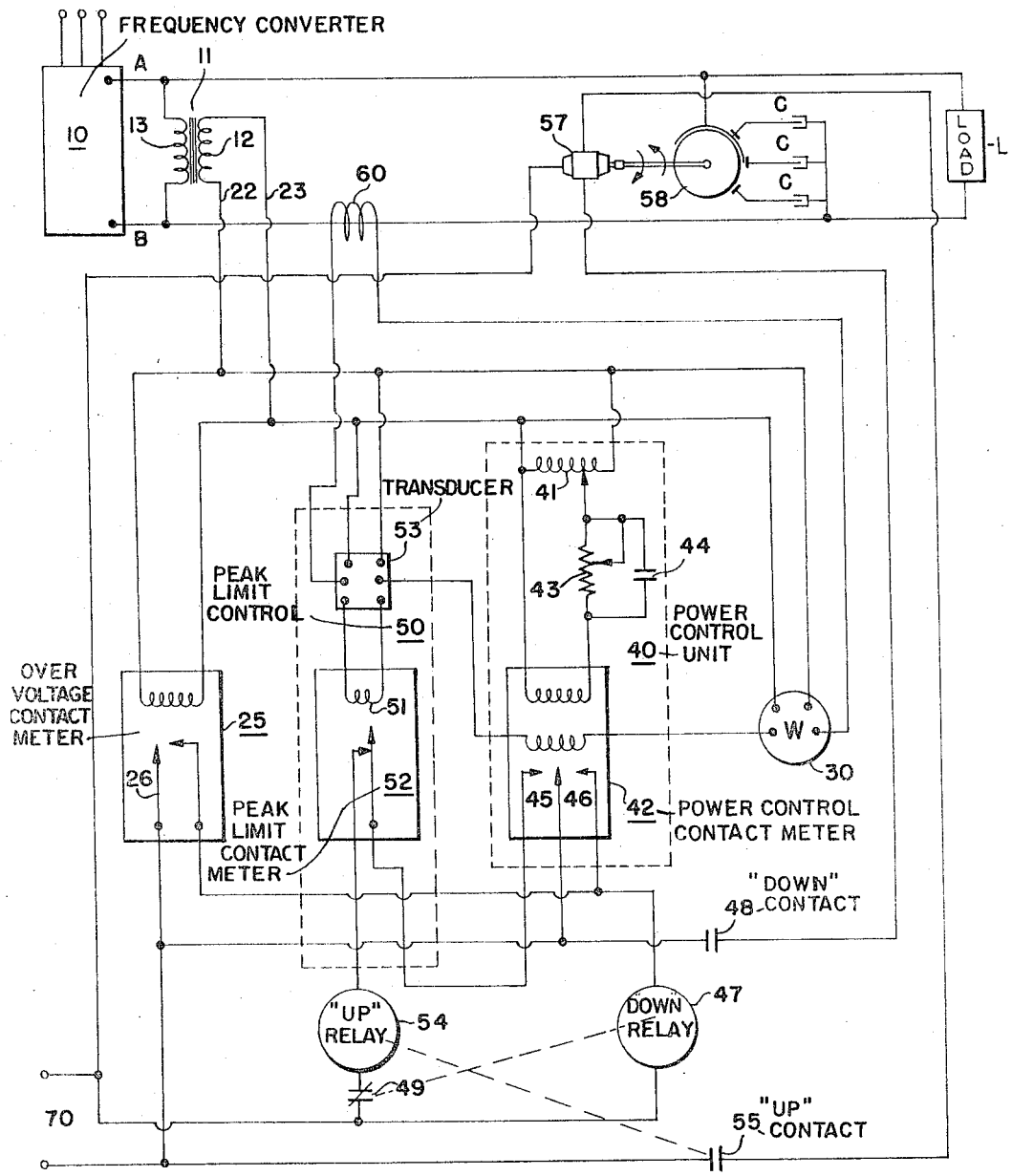
FIG. 1 is a schematic electrical showing of a preferred form of my invention.

Referring now to the drawings, in all of which like parts are designated by like reference characters, at 10 I show a multiphase to single phase multiplier, the output lines A and B being connected to a load L. A potential transformer 11 is provided with a primary 13 connected across the output lines A and B and with its secondary 12 arranged to deliver voltage signals to the control circuit of my invention. These are delivered by connections 22, 23 to a voltmeter 25 which includes switching means 26 which operates at a preselected voltage indicated by the voltmeter to prevent over voltage and achieves this by "subtracting" or switching off capacitance C in the output circuit. The capacitance C, while shown as comprising three capacitors, can be any appropriate number or value. Voltage signals are also delivered from the secondary 12 of the potential transformer 11 to a wattmeter 30, to a power control circuit, indicated generally at 40, and to a "peak" limit control, indicated generally at 50.

A current transformer 60 is provided in the output circuit and is connected to deliver signals to the wattmeter 30, the power control circuit 40 and the "peak" limit control 50.

The combined voltage and current signals are operable hence to operate the wattmeter, the power control circuit and the peak limit control.

Figure 2:
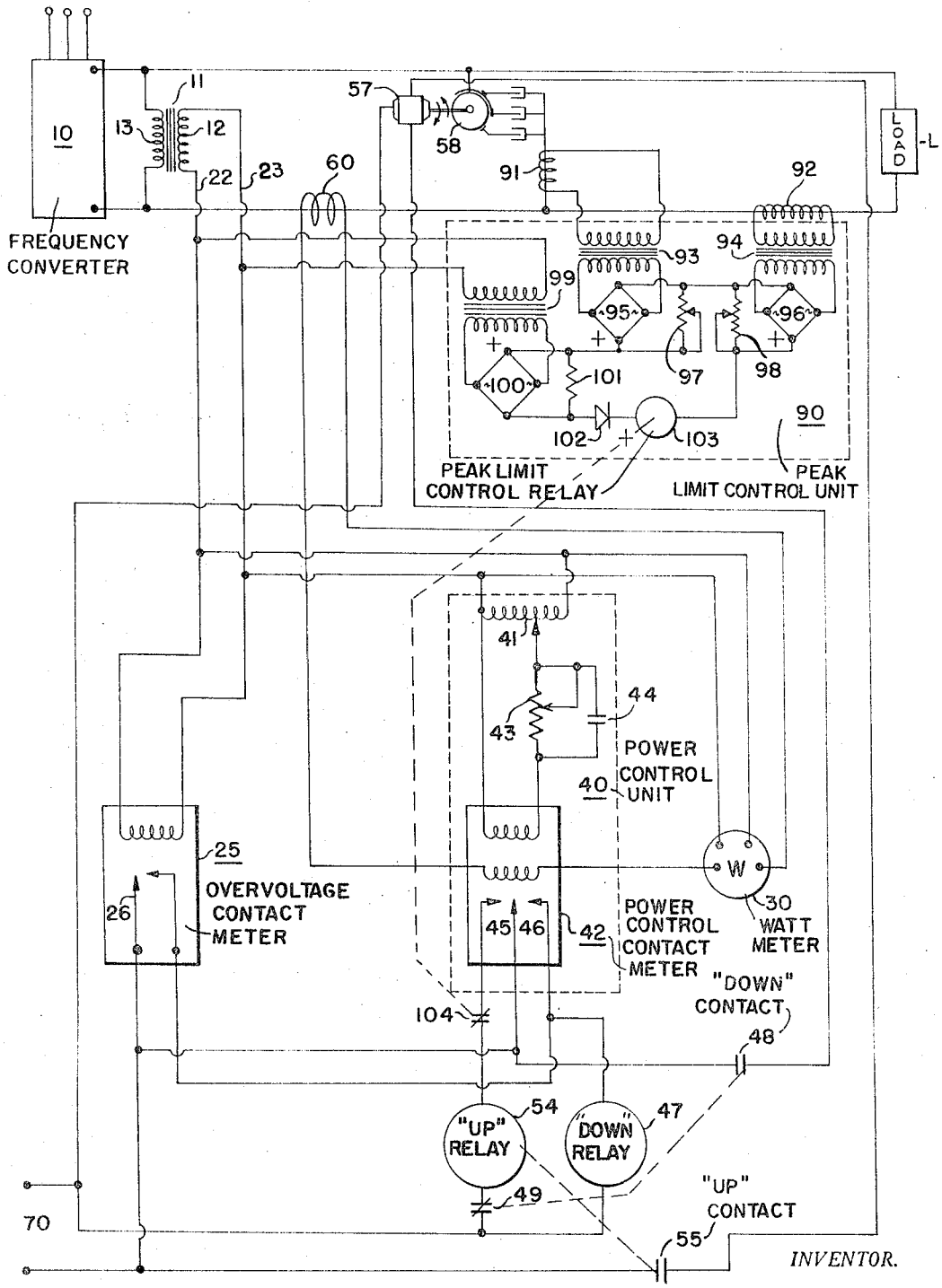
FIG. 2 is a view of an alternative means to limit the addition of capacitance at the maximum permissible by the design of the converter.

Referring now to the drawings, in each of the forms of my invention shown in FIGS. 1 and 2, the voltmeter 25, the power control 40, the wattmeter 30 are substantially the same. The form of FIG. 2 distinguishes from the form of FIG. 1 in its "peak" control circuitry. The form of FIG. 1 maintains its peak control through a meter type sensitive relay 51 having normally closed contacts 52 which are adjusted to open at a predetermined combined signal level. A form of transducer 53, which supplies an output signal corresponding to the phase angle between current and voltage delivered to it, is interposed between the relay 51 and the output A, B. The contacts 52 in the meter type sensitive relay 51 are normally closed, as shown, and are connected to the relay 54 and to a source of control power supply, indicated at 70, in such manner that the relay 54 normally energized by power control 40 to add capacitance is deenergized if the signal delivered to the meter type sensitive relay 51 exceeds a predetermined value and hence the addition of further capacitance to the output circuit is prevented.

This serves an important function. It is known that when capacitance in excess of that needed to attain optimum tuning is added to the output, the output power is progressively reduced, as illustrated in FIG. 3 in dotted lines.

Figure 3:
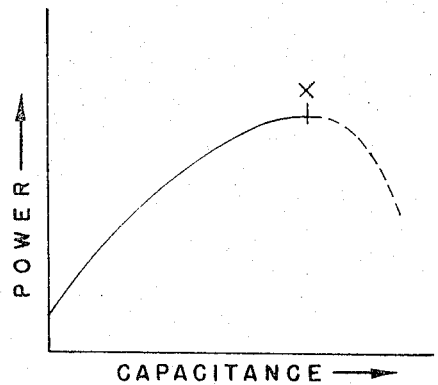
FIG. 3 is a graph illustrating the relationship of output power and the capacitance in the output circuit which is a fundamental characteristic of frequency converters of the type to which this invention appertains.

Hence, it will be observed, the circuit is capable of the automatic addition of capacitance until a power peak, indicated in FIG. 3 at x is reached by the operation of the power control circuit indicated at 40 and said addition is interrupted by the recited operation of contacts 52 whenever capacitance reaches the permissible maximum or "peak" value.

The power control circuit 40 briefly referred to above, not only adds capacitance but subtracts the same from the output circuit and operates at a preselected power value. This circuit comprises a variable transformer 41 disposed across the voltage supply lines 22, 23, the output of the transformer being manually set or adjusted to establish the relative value of the voltage signal delivered thereby to a sensitive wattmeter relay 42 connected to it.

If the output power is at a lower level than that preselected by the setting of the transformer 41, meter contacts 45 will be closed thus delivering power to the relay 54 closing contacts 55 thus delivering power to reversible motor 57 rotating the capacitor switch 58 to progressively add capacitance C to the load circuit until the desired power level is reached.

If the output power is at a higher level than that preselected by the setting of the transformer 41, meter contacts 45 open, contacts 46 close energizing relay 47 which closes contact 48 thereby delivering power to motor 57 rotating the capacitor switch 58 in a reverse direction to progressively remove capacitance C from the load circuit until the desired power level is reached.

An adjustable resistor, as shown in FIG. 1 at 43, may be connected in series in this circuit to provide a convenient high-low control, such as might be operated by a pyrometer or other sensing devcie, to cause the control to operate at higher or lower power values than those preselected at the transformer 41. For example, for holding at a lesser value an induction furnace, the pyrometer closes contacts 44 thereof when the desired temperature is reached. When such lesser value is no longer desired, contacts 44 are opened and the circuit then operates to restore the power to the preselected higher power level.

Under certain conditions, as when the ohmic value of the load would require excessive voltage to achieve the power level selected by the setting of the variable transformer 41, at the upper permissible level of voltage, the switching means 26 in voltmeter 25 operates to energize relay 47 simultaneously opening contacts 49 to disable relay 54 to prevent further addition of capacitance and simultaneously close contacts 48 to apply power to the reversible motor 57 to subtract progressively capacitance C from the load circuit until the voltage drops below its "safe" level. Hence, at such times, it overrides the power circuit 40 normally controlling the power level.

The wattmeter 30 serves merely to indicate the actual power level delivered to the load at all times.

Figure 4:
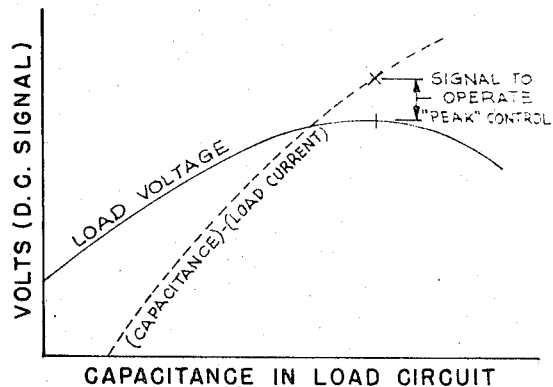
FIG. 4 is a graph illustrating the relationship between the load voltage and the difference between load current and capacitance current as embodied in the peak control circuit of FIG. 2.

FIG. 2, as stated above, operates in identical fashion to FIG. 1 except that the peak control signal is obtained in a different manner than that of FIG. 1 and peak control means 90 are substituted for the peak control 50 of FIG. 1. Peak control 90, it will be observed, senses the capacitor current by means of a current transformer 91, the load current by means of a second current transformer 92, and these two currents are converted to D.C. voltage signals by means of transformers 93, 94 and rectifiers 95, 96 respectively. The resistors 97, 98 are connected to the rectifiers in such manner that a D.C. signal is obtained which is proportional to the difference of the capacitor and load currents. The value of this signal is indicated in the dotted line showing (capacitor current)—(load current) of FIG. 4.

A D.C. voltage signal corresponding to the load voltage is obtained from a transformer 99, rectifier 100 and compared across resistor 101 with the D.C. signal corresponding to the difference between the capacitor current and the load current as described above. The D.C. voltage signal described is shown in solid line in FIG. 4.

By appropriate selection of the components of the peak circuit described, a signal can be derived at the appropriate point to cause a current to flow through rectifier 102 and relay 103 in the direction shown in FIG. 2 energizing the relay 103 to open contact 104 which is the equivalent of contact 52 of FIG. 1 thus preventing capacitance from being added in excess of that required to achieve peak operation as described.

Figure 5:
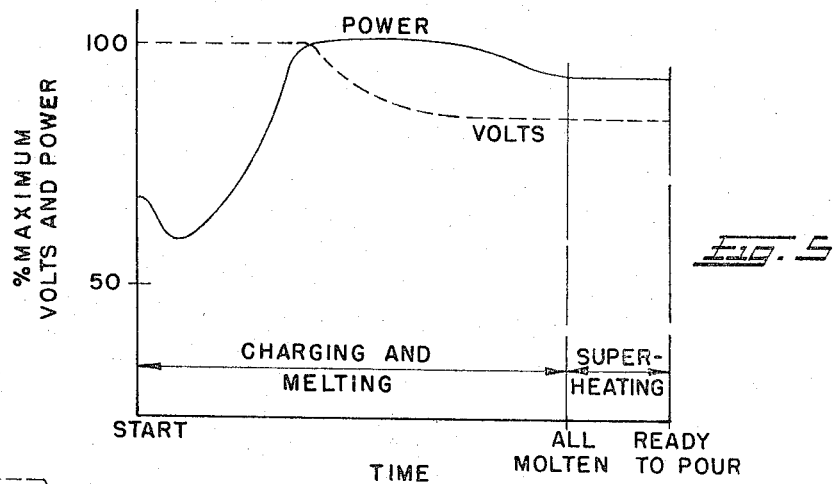
FIG. 5 is a graph illustrating a typical melting furnace load with the automatic control and adjusted to give maximum power.
Figure 6:
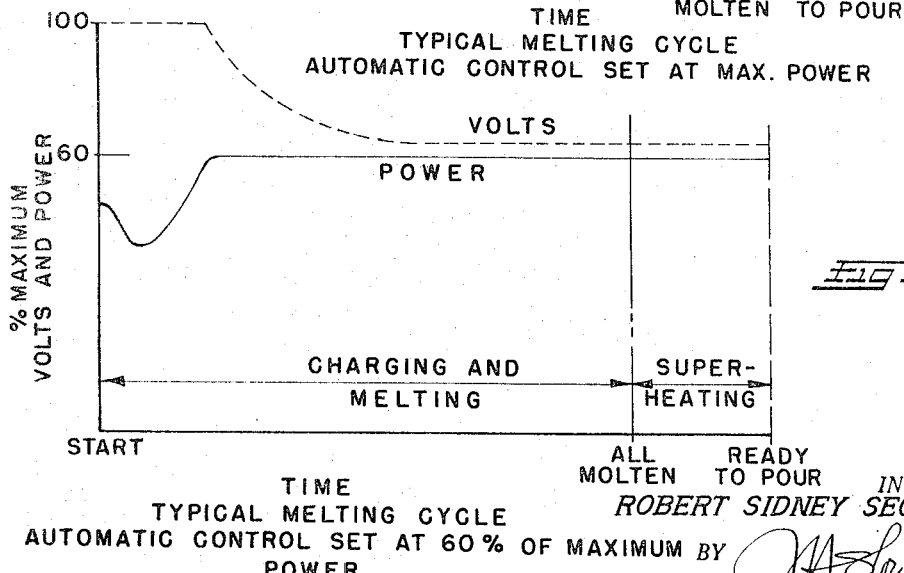
FIG. 6 is a graph illustrating a typical melting furnace load with the automatic control and adjusted to give a preselected power level, which in the graph is designated as 60%.

FIGS. 5 and 6 as stated illustrate examples of the operation of the control circuits of FIGS. 1 and 2 when applied to a typical melting and holding furnace. It will be noted that in such examples, that the control of my invention achieves and maintains in an improved manner, the desired and preselected power output level within safe operating limits without the necessity of continuous observance and manual control.

Such control is achieved in both forms illustrated herein by sensing the difference between the power delivered and that desired, as determined by the setting of a variable transformer 41, and regardless of changes in the ohmic value of the load and line voltage.

Further the control avoids over-voltage and also loss of control due to over-tuning.

It will be apparent that although my invention has been described in connection with preferred circuiting that various changes and departures may be made there, without however departing from the spirit of my invention and the scope of the appended claims.

What I claim is:

1. Automatic control devices for a frequency converter, a load circuit connected to said converter, said load circuit having a plurality of capacitors therein, said automatic control devices comprising reversible switching means associated with said capacitors for adding and subtracting said capacitors in the load circuit, a sensitive wattmeter relay responsive to combined current and voltage signals and responsive to power delivered to the load circuit, means whereby the relative value of the signals is adjustable to a predetermined ratio with respect to the current and voltage of the load circuit, a resistor in the voltage circuit of the sensitive wattmeter relay adjustable to cause the said relative values to be adjusted to a higher and lower ratio, contact means bypassing said resistor to restore power to the predetermined ratio, switching means in said relay to deliver power to the above recited capacitor switching means to cause the same to add and subtract capacitors, voltmeter switching means and peak limit control means inoperative under certain operating conditions, the voltmeter switching means operable under overvoltage conditions to subtract capacitors from the load circuit, the peak limit control means preventing the addition of capacitors beyond that required for maximum tuning of the frequency converter load circuit.

2. Automatic control means for a frequency converter, a load circuit connected to said converter, said load circuit having a plurality of capacitors therein, means delivering signals to control means responsive to voltage and current in the load circuit, variable means for preselecting a desired power operating level for the load, certain of said control means responding to voltage and current in the load circuit including the preselecting means adding and subtracting capacitors in the load circuit to maintain power at a preselected level, voltmeter switching means limiting the addition of capacitors to prevent over-voltage and overriding the said first control means to subtract capacitors if "safe" voltage is exceeded, and peak limit control means overriding the said first recited control means and including a transducer to supply an output signal corresponding to the phase angle between current and voltage delivered to it from the load circuit, the said output signal being delivered to a sensitive relay which is adjustable to open contacts therein at a certain predetermined phase angle relationship between the said voltage and current, which relationship occurs at maximum tuning of the frequency converter-load circuit to prevent the addition of capacitors beyond that required for maximum tuning of the frequency converter load circuit.

3. Automatic control means for a frequency converter, a load circuit connected to said converter, said load circuit having capacitance therein, means delivering signals to control means responsive to voltage and current in the load circuit, means for preselecting a desired power operating level for the load, certain of said control means responding to voltage and current in the load circuit adding and subtracting capacitance in the load circuit to maintain power at a preselected level, and certain other of said control means limiting the addition of capacitance to prevent over-voltage and overriding the said first control means to subtract capacitance under different operating conditions if "safe" voltage is exceeded, and other means overriding the said first recited control means to prevent the addition of capacitance beyond that required for maximum tuning of the frequency converter load circuit, said other means comprising rectified signal means, a first said signal means being a capacitor current signal, a second said signal means being a load current signal, and a third said signal means being a voltage signal, the said first and second signals being combined to deliver a signal proportional to their difference and this last recited signal being combined with the voltage signal to prevent the said addition of capacitance.

4. Automatic control means for a frequency converter, a load circuit connected to said converter, said load circuit having capacitance therein, means delivering signals to control means responsive to voltage and current in the load circuit, means for preselecting a desired power operating level for the load, sensitive wattmeter relay responding to voltage and current in the load circuit adding and subtracting capacitance in the load circuit to maintain power at a preselected level, and certain other of said control means limiting the addition of capacitance to prevent over-voltage and overriding the said first control means to subtract capacitance under different operating conditions if "safe" voltage is exceeded, and other means overriding the said first recited control means to prevent the addition of capacitance beyond that required for maximum tuning of the frequency converter load circuit, said other means comprising rectified signal means, a first said signal means being a capacitor current signal, a second said signal means being a load current signal, and a third said signal means being a voltage signal, the said first and second signals being combined to deliver a signal proportional to their difference and this last recited signal being combined with the voltage signal through a rectifier and sensitive relay so that when the differential signal exceeds the voltage signal, the said relay is energized to open contacts in the said wattmeter relay to prevent the said addition of capacitance.

References Cited by the Examiner

UNITED STATES PATENTS

| | | | |
|---|---|---|---|
| 2,971,754 | 2/1961 | Seyfried | 219—10.77 X |
| 3,063,003 | 11/1962 | Pirhofer | 323—102 X |
| 3,084,323 | 4/1963 | Sommer et al. | 323—128 X |
| 3,185,811 | 5/1965 | Kasper et al. | 323—105 X |

JOHN F. COUCH, *Primary Examiner.*

A. D. PELLINEN, *Assistant Examiner.*